H. G. PANNING & J. B. McADAMS.
LOCK.
APPLICATION FILED SEPT. 19, 1917.
1,300,711.
Patented Apr. 15, 1919.
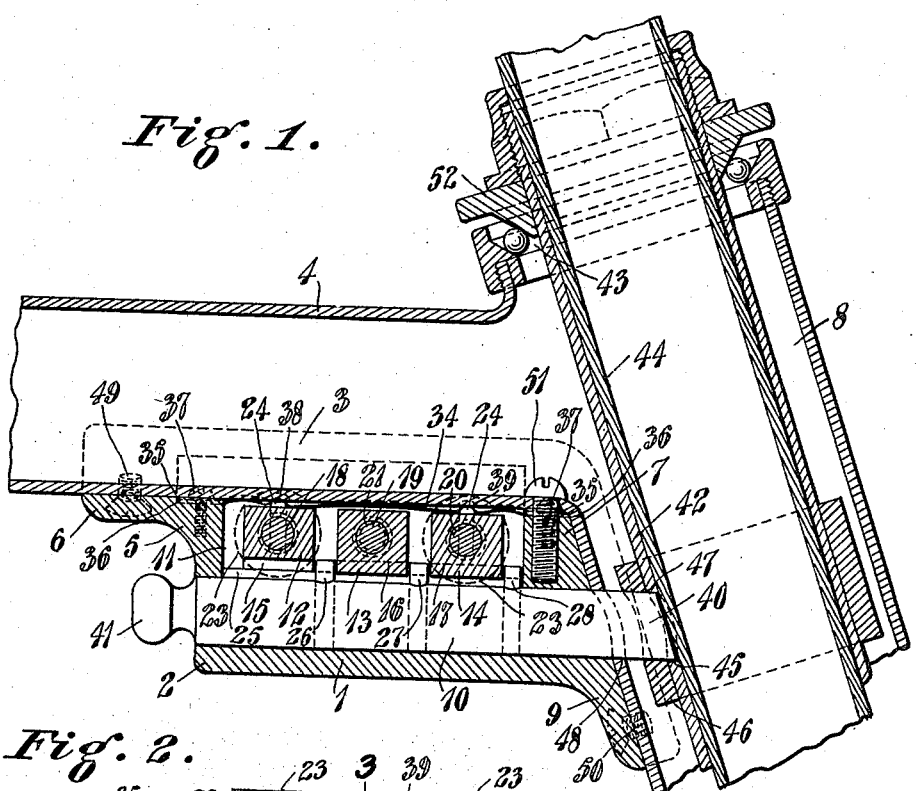
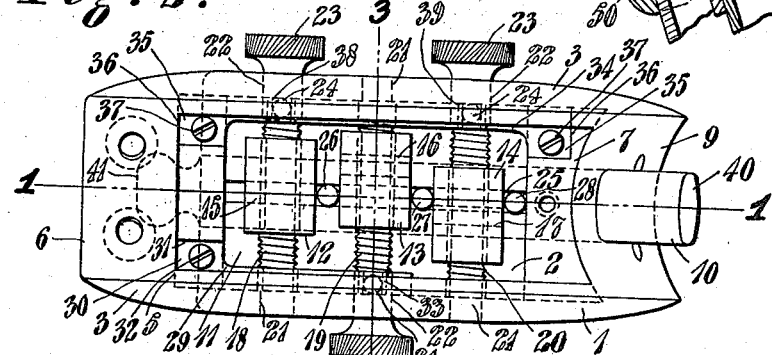
Witnesses:
Clarence Perdew
Irene Parker.
Inventors
Herbert G. Panning
John B. McAdams
By James N. Ramsey
Attorney.

UNITED STATES PATENT OFFICE.

HERBERT G. FANNING AND JOHN B. McADAMS, OF MIDDLETOWN, OHIO.

LOCK.

1,300,711.　　　　Specification of Letters Patent.　　Patented Apr. 15, 1919.

Application filed September 19, 1917.　Serial No. 192,097.

*To all whom it may concern:*

Be it known that we, HERBERT G. FANNING and JOHN B. MCADAMS, citizens of the United States, and residents of Middletown, in the county of Butler and State of Ohio, have invented certain new and useful Improvements in Locks, of which the following is a specification.

Our invention relates to permutation locks, and more especially to those designed or adapted for locking the steering mechanism of a vehicle or other conveyance. The lock herein illustrated and described is especially designed for locking the steering head of a bicycle or motorcycle.

The object of our invention is to provide a device of this character which will be simple and comparatively inexpensive to make; which may be very conveniently manipulated by the rightful user, but which will be reasonably difficult of manipulation by others. Another object of our invention is to insure against the wrongful removal of the lock from the bicycle head or other device on which it is mounted for use, but which will not be too difficult to remove by the rightful user in case it is necessary to repair or overhaul the interior mechanism of the lock.

In the drawing:

Figure 1 is a vertical longitudinal section of part of a bicycle frame and head and the preferred embodiment of our improved lock thereon, the section being on a plane corresponding to the line 1—1 of Fig. 2;

Fig. 2 is a plan view of the lock removed from the bicycle; and

Fig. 3 is a vertical cross-section on a plane corresponding to the line 3—3 of Fig. 2.

As we prefer to construct our invention and as shown herein, there is a casing 1 with a thick bottom 2 and comparatively thin sides 3 extending up to flank the lower part of the upper bicycle frame-bar 4; with a rear end 5 having a rearwardly extending flange 6 continuous with the upper parts of the sides 3 and fitting against the lower part of the frame-bar 4; and with a comparatively thick front 7 which is suitably inclined and shaped in transverse section to fit snugly against the rear side of the bicycle head 8 and having a downwardly extended flange 9 continuous therewith and also fitting against said head 8.

Extending longitudinally through the thick bottom 2 and having a snug sliding fit in a suitable bore therein is the bolt 10. Occupying the space 11 above the bottom 2 and between the sides 3 are a plurality of tumbler blocks 12, 13 and 14, each having a flat lower side fitting snugly against the upper side of the bottom 2 which is made flat and smooth for this purpose, and each having in this lower side a slot 15, 16 or 17, as the case may be, extending longitudinally of the lock. Extending transversely through each one of these tumbler blocks 12, 13 and 14 is a screw 18, 19 or 20 with the tumbler block threaded thereon like a nut. Each screw is journaled in the casing sides 3 by a reduced part 21 at each end, and an unreduced part 22 near the other end, which other end is provided with a head 23 outside the casing for turning the screw. Just inside the casing next to this unreduced part 22, each screw has a pin 24 extending radially through it. Thus, the shoulder next to the reduced part 21 at one end bears against the inner surface of that casing side 3 while the pin 24 bears against the other casing side, and end play of the screw is thus substantially prevented. Therefore, when the screw is turned, the tumbler block threaded thereon will be moved across the bottom of the casing.

There is a slot 25 opening down into the bore that contains the bolt 10 throughout the length of the bottom of the space 11, and fixed in the bolt 10 and extending up through this slot 25 are a plurality of stop-pins 26, 27 and 28. The widths of these pins and their extension above the bottom of the space 11 are such that each pin will pass through the slot in the bottom of an adjacent tumbler-block if that slot is registered with the line of travel of the pin as the bolt 10 is pulled back or pushed forward in its bottom. The tumbler-blocks are so spaced from each other, and the terminal ones of the series are so spaced from the adjacent ends of the casing that the upward projections of the pins may occupy these spaces while the tumbler-blocks are moved across the casing by the screws.

As here shown, the screws are so positioned in the casing that two of them, 18 and 20, have their heads 23 at one side of the casing, and the other, 19, has its head at the other side. This allows the heads to be larger with a given spacing of the screws while leaving enough space between the two heads to allow convenient manipulation of the screws by grasping the heads. Also, this arrangement makes more convenient the application of indicating and holding means to the respective screws.

As shown herein, this indicating and holding means comprises flat springs with recesses which the ends of the pins 24 enter by virtue of the yielding of the spring and thus hold the respective screw against turning and also give a palpable as well as slightly audible indication of the positions of the screws. Thus, the screw 19 is provided with the flat spring 29 which has a base 30 fastened in a shallow recess 31 at the rear end of the casing by means of a screw 32; this spring extending forward close along the casing side 3 over the screw 19 where it is provided with an upward and then downward bend 33 within which the projecting end of the pin 24 of this screw 19 engages once in each revolution of the screw 19; the spring 29 yielding upward as the pin passes into the recess thus formed by the bend 33, or, as it passes out therefrom; but the spring snapping down on the end of the pin 24 as the pin comes upright, and by a comparatively slight pressure holding the screw against any except intentional turning. Also it will be understood that the snapping of the spring will be readily felt by the one grasping the knob 23 of the screw, and the noise made by the snapping will be loud enough to be heard by the manipulator. The other screws 18 and 20 are controlled and have their positions indicated in a similar manner by a single long spring 34 extending from end to end of the interior of the casing and having bases 35 secured in shallow recesses 36 in the casing ends by screws 37; and having upward and downward bends 38 and 39 which receive the ends of the pins 24 of the screws 18 and 20, respectively. The intermediate parts of this long spring are made long enough to bow upwardly slightly and thus permit the slightly upward and downward movements required of the spring between its fastenings as the pins pass into and out of the recesses formed by the bends 38 and 39.

The pins 26, 27 and 28 are so positioned in the bolt 10 that when the pins lie forward of the tumbler-blocks 12, 13 and 14, respectively, the front end 40 of the bolt 10 will project a considerable distance past the front end of the casing, as shown in the drawing; but so that when these pins lie behind the respective tumbler-blocks, this end 40 of the bolt 10 will be retracted so that it lies within or has only a very slight extension from the front end of the casing. The rear end of the bolt is in the form of a knob 41 which always extends outside the rear end of the casing for convenient grasping to pull the bolt 10 back or push it forward.

As is well understood in the art of bicycle construction, the tube 42 lies within and concentric with the bicycle head 8 and has suitable bearings at the upper and lower ends of the head; only the upper one 43 being shown herein. This tube receives the stem 44 of the handle-bars of the bicycle, which bars are not shown herein. The end 40 of the bolt 10 is so beveled and the pins 26, 27 and 28 are so positioned in the bolt, as before described, that in its forward position the end 40 will project into an opening 45 in the adjacent side of the tube 42 but will slightly clear the adjacent side of the stem 44 within said tube 42. To properly reinforce this part of the tube 42 for effective engagement with the forwardly projected bolt 10, we prefer to provide a collar 46 fixed around the outside of the tube 42 inside the head 8 and extending along the tube 42 a short distance above and below the region of entrance of the bolt 10, in which region the collar 46 is provided with an opening 47 registering with the opening 45 in the tube 42 for the bolt to pass through. It will also be understood that the rear side of the head 8 is provided with an opening 48 that registers with the bore of the casing 1 when said casing properly fits up under the bar 4 and behind the head 8 of the bicycle, as hereinbefore described; so that the bolt is readily projected inside the head 8 and into the registering openings 47 and 45 of the collar 46 and tube 42.

As here shown, the casing 1 is fastened to the bicycle frame by screws 49 passing up through the rear flange 6 into the frame-bar 4 and by screws 50 passing forward through the lower front flange 9 into the head 8. After these screws are in position, they may be filed or ground even with the surfaces of the flanges 6 and 9, and then when the enamel or other finish is applied to the outside of the casing and the bicycle-frame the screws will be readily concealed. Nevertheless, the rightful user of the bicycle and lock, if it is found necessary to remove the lock, may, with sufficient time and attention, sufficiently remove the exterior finish to find the screws 49 and 50 and by suitable well-known means remove them. Any one surreptitiously trying to remove the lock could not thus find the screws quickly enough to avoid apprehension in most cases.

As a further provision against surreptitious removal of the lock, we prefer to provide a master screw 51 passed down through the lower part of the frame-bar 4 close to its junction with the head 8 into the thick front 7 of the casing 1. Access for this is had by removing the handle-bars and removing the tube 42 with the attached part 52 of its upper bar 43, whereupon the upper end of the head 8 will be opened vertically above the screw 51 in most bicycles, as will readily seen in Fig. 1 of the drawing. It will be seen that when the bolt 10 is pushed forward engaging in the openings in the tube 42 and its collar 46, it will be impossible to withdraw the tube 42 for access to the screw 51. Thus, one could not remove the lock from the bicycle unless it were first unlocked; when, of course, for ulterior purposes, the removal would be unnecessary.

Constructed as above described, the locking or unlocking will depend upon the alinement of all of the grooves 15, 16 and 17 in the respective tumbler-blocks with the line of travel of the bolt-pins 26, 27 and 28; since if any one of the tumbler-blocks has not its groove thus alined, the bolt-pin to the rear will prevent forward movement of the bolt 10, or the bolt-pin forward will prevent rearward movement of the bolt 10 as the case may be. Each tumbler-block preferably has its slot located slightly differently from the location of the slot in each other tumbler-block. Thus, starting with a block against either side 3, different numbers of turns of the screws will position the tumbler-blocks differently transversely of the casing, and each block will be moved the distance of the pitch of the thread of its screw at each complete turn of the screw. Thus, as seen in Fig. 2, the tumbler-block 12 has its slot 15 alined with the bolt-pins; but the tumbler-block 13 has its slot 16 a considerable distance to one side, while the third tumbler-block 14 has its slot 17 a less distance to the other side. Therefore, it will be seen that the screws 19 and 20 being pitched alike, one will have to be turned in one direction a certain number of times and the other in the other direction a certain different number of times to bring these slots 16 and 17 also in alinement with the bolt-pins before the bolt 10 may be pulled backward. This number of revolutions and direction of turning of the respective screws to effect this alinement is thus the " combination " of the lock; and may vary for different locks according to the positioning of the slots in the tumbler-blocks or according to the positioning of the tumbler-blocks across the casing when assembled with their screws, or according to the positions of the slots in the blocks and of the blocks transversely of the casing.

It will also be understood that making some of the screws of different pitch, either in extent or direction, from others, will be another means of varying the " combination."

Also, it will be understood that while three tumbler-blocks and their screws and other accompanying details are shown herein, there may be only two, or there may be any greater number; the length of the device being varied accordingly; and that such decrease or increase in the number of the elements will simplify or greatly complicate the possible "combination" as the case may be.

Moreover, it will be understood that the shape of the casing may be varied to adapt it to fit different frames of bicycles or other structures; and that when used with any steering mechanism such as the one illustrated, or others, the mechanism may be locked in such position that the conveyance may travel only in a straight line or only in a curve; in either case making it impracticable to wrongfully make away with the conveyance traveling in its usual convenient manner; as for instance, to ride the bicycle or motorcycle or even to conveniently "lead" it; and, in the case of heavier conveyances, making their removal practically impossible without unlocking.

It may also be pointed out that the locks may be provided separately from the devices to which they are to be attached, and that in such case extra material may be left in the parts of the casing for removal by the one applying the lock, in order to make the casing fit the particular device. Thus, for instance, the locking casing herein shown might have additional material on its front and top to be cut away by the owner of the bicycle, or by a repair man who would fit the lock to the bicycle. Thus, the locks may be made in quantity and fitted to bicycle frames having bars 4 and heads 8 of varying diameters and degrees of inclination to each other. Likewise, it will be understood that the end 40 of the bolt may have extra material for removal in fitting; and that the collars 46 may be furnished along with the locks either bored or not and ready for attachment to the tubes 42 or to be fitted to tubes 42 of varying diameter.

It will be understood, therefore, that while we have illustrated and described in considerable detail a specific example of our invention, we are not limited to this showing and description, but what we claim as new and desire to secure by Letters Patent is:

In a lock comprising a bolt having a projection, a plurality of tumbler blocks each having a slot through which said projection must pass to bring the bolt into locking position, and a plurality of screws threaded through respective ones of said tumbler blocks for severally sliding the blocks across the path of travel of said projection, a casing having a relatively thick bottom, and relatively thin sides and rear extending up from said bottom to bear against the lower side of the upper frame bar of a bicycle, and a front end to bear against the rear side of the head of said bicycle, said bottom having a longitudinal bore in which said bolt is slidable to project or retract its end at the front of said casing, and having means projecting from said casing to be grasped for manipulation, and said bottom having a slot longitudinally of the upper side of its bore through which said projection of said bolt extends, and said screws being journaled in said sides of said casing, and having projections outside of the casing for turning them to slide said tumblers across said slot, substantially as and for the purposes set forth.

HERBERT G. FANNING.
JOHN B. McADAMS.

Witnesses:
WALTER FANNING,
ELI B. GRUBB.